(12) United States Patent
Bergqvist et al.

(10) Patent No.: US 9,392,506 B2
(45) Date of Patent: *Jul. 12, 2016

(54) METHOD OF TRANSMITTING CELL IDENTITY INFORMATION

(71) Applicant: Telefonaktiebolaget L M Ericsson (publ), Stockholm (SE)

(72) Inventors: Jens Bergqvist, Linköping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 260 days.

This patent is subject to a terminal disclaimer.

(21) Appl. No.: 14/034,644

(22) Filed: Sep. 24, 2013

(65) Prior Publication Data

US 2014/0024377 A1    Jan. 23, 2014

Related U.S. Application Data

(63) Continuation of application No. 13/059,554, filed as application No. PCT/SE2009/050458 on Apr. 29, 2009, now Pat. No. 8,620,300.

(60) Provisional application No. 61/089,587, filed on Aug. 18, 2008.

(51) Int. Cl.
*H04W 36/00*    (2009.01)
*H04J 11/00*    (2006.01)
(Continued)

(52) U.S. Cl.
CPC ....... *H04W 36/0061* (2013.01); *H04J 11/0093* (2013.01); *H04W 36/14* (2013.01); *H04W 48/12* (2013.01)

(58) Field of Classification Search
CPC ............ H04W 48/20; H04W 36/0016; H04W 36/0083; H04W 76/027; H04W 36/08; H04W 48/02; H04W 36/24; H04W 48/18; H04W 76/028; H04W 36/12; H04W 36/14; H04W 36/0061; H04W 36/0066; H04W 36/0005; H04W 36/04; H04W 76/046; H04W 48/17
See application file for complete search history.

(56) References Cited

U.S. PATENT DOCUMENTS 8,036,656 B2    10/2011    Jeong et al.
8,072,953 B2    12/2011    Mukherjee et al.
(Continued)

FOREIGN PATENT DOCUMENTS

EP    1286560 A2    2/2003
EP    1944994 A1    7/2008
(Continued)

*Primary Examiner* — Liton Miah
(74) *Attorney, Agent, or Firm* — Coats & Bennett, P.L.L.C.

(57) ABSTRACT

In a cellular radio system cell identities, in particular E-UTRAN PCIDs, are grouped in accordance with the area (e.g., Tracking Area), to which they belong to in a message transmitted from a radio base station to a mobile station. In one embodiment the grouped cell identity information is transmitted as a broadcast message. A multi RAT (e.g., GERAN/E-UTRAN) capable mobile station receiving such a broadcast message where the IDs are grouped together in tracking area groups is then enabled to determine the neighboring cells that belong to the same area. When cell reselection to an E-UTRAN cell is rejected due to a Tracking Area not being allowed, the mobile station can then be allowed to directly initiate cell reselection to E-UTRAN cells that are not part of the same PCID group, and which do not belong to the same tracking area.

18 Claims, 3 Drawing Sheets

(51) Int. Cl.
  *H04W 36/14*  (2009.01)
  *H04W 48/12*  (2009.01)

(56) References Cited

U.S. PATENT DOCUMENTS

| | | |
|---|---|---|
| 2005/0043049 A1 | 2/2005 | Demir et al. |
| 2007/0197220 A1 | 8/2007 | Willey |
| 2008/0102896 A1* | 5/2008 | Wang et al. .................. 455/560 |
| 2008/0280604 A1 | 11/2008 | Ore et al. |
| 2009/0046655 A1 | 2/2009 | Zhao et al. |
| 2010/0178920 A1* | 7/2010 | Kitazoe et al. ................ 455/436 |

FOREIGN PATENT DOCUMENTS

| | | |
|---|---|---|
| GB | 2369957 A | 6/2002 |
| JP | 2006514818 A | 5/2006 |
| JP | 2010508761 A | 3/2010 |
| WO | 2007144029 A1 | 12/2007 |
| WO | 2008054668 A2 | 5/2008 |
| WO | 2008081315 A1 | 7/2008 |

* cited by examiner

METHOD OF TRANSMITTING CELL IDENTITY INFORMATION

RELATED APPLICATIONS

This application is a continuation of U.S. application Ser. No. 13/059,554, filed Feb. 17, 2011, which was the National Stage of International Application No. PCT/SE2009/050458, filed Apr. 29, 2009, which claims the benefit of U.S. Provisional Application No. 61/089,587, filed Aug. 18, 2008. The disclosures of each of these applications are incorporated herein by reference in their entirety.

TECHNICAL FIELD

The present disclosure relates to a method and a device for providing information in a cellular radio system. In particular the present disclosure relates to transmission of cell identity information in a cellular radio system.

BACKGROUND

There is currently work ongoing within the Third Generation Partnership Program (3GPP) to introduce a new Radio Access Technology (RAT). The new RAT is called E-UTRAN (Evolved Universal Mobile Telecommunications System Terrestrial Radio Access Network), and is also known as Long Term Evolution (LTE). One item to be specified is the interworking between E-UTRAN and the other existing RATs, such as Global System for Mobile Communication/Enhanced Data rates for GSM Evolution (GSM/EDGE) Radio Access Network (GERAN) and Universal Mobile Telecommunications System (UMTS) Terrestrial Radio Access Network (UTRAN).

In order to inform mobile stations in a cellular radio system about neighboring E-UTRAN cells, the procedure is to broadcast information about the neighboring (allowed) E-UTRAN frequencies and an optional "black list" of not allowed neighboring E-UTRAN cells for each of the E-UTRAN frequencies. The E-UTRAN cells are then identified through their Physical Layer Cell Identities (PCID), which is an identity that is locally unique per E-UTRAN frequency. Efficient coding of sets of PCIDs is currently being discussed within 3GPP for the case where a group of PCIDs needs to be blacklisted, e.g. at country borders. The reason is that the information about what E-UTRAN cells that are blacklisted or which are not blacklisted needs to be sent on the broadcast channels. The broadcast channels typically have a very limited capacity and hence there is a need to limit the use of the resources of the broadcast channels as far as possible.

In comparison, the information about neighboring GERAN and UTRAN cells is sent as lists of allowed neighboring GERAN and UTRAN cells. Cells are divided into different areas, within GERAN and UTRAN into Location Areas/Routing Areas and within E-UTRAN into Tracking Areas. Each cell thus belongs to a Location Area/Routing Area (GERAN and UTRAN) or a Tracking Area (E-UTRAN).

When a mobile station (in GERAN mode) performs measurements for cells that belong to non-GERAN access technologies, such as UTRAN and E-UTRAN (LTE) the mobile station is unaware of the Location Area/Routing Area/Tracking Area they belong to. Also in some scenarios a mobile station is not allowed to enter a specific Location/Routing/Tracking Area. This becomes apparent when the mobile station tries to perform cell reselection to a cell in that area. For the GERAN to UTRAN case today the mobile station is then not allowed to try cell reselection to any UTRAN cell on the same frequency for a certain time, a back off time. The reason is that the mobile station is not aware of what Location/Routing Areas the other UTRAN cells belong to.

Thus, when the mobile station is in an area with different Location/Routing/Tracking Areas, where some are allowed and some are not, the mobile station will in some scenarios not be able to perform cell reselection to any of the allowed cells due to that cell reselection was attempted for a not allowed cell/area the first time. This can be either in idle mode or in packet transfer mode where the mobile station controls the cell reselection/handover (in NC0 and NC1 modes).

In case the mobile station is in dedicated mode or packet transfer mode, the mobile station would in the corresponding scenarios be performing unnecessary measurements, and transmit unnecessary measurement reports, of cells that belong to not allowed Location/Routing/Tracking Areas. The list of not allowed areas is kept in the mobile station based on previous rejected accesses in those areas.

Hence, there exist a need for a method and a mobile station that eliminates or reduces the problems encountered when performing cell reselection.

SUMMARY

It is an object of the present disclosure to overcome or at least reduce some of the problems as described above.

These objects and others are obtained by the method and system as set out in the appended claims. Thus, in accordance with the present disclosure, cell identities, in particular the E-UTRAN Physical Layer Cell Identities (PCIDs), are grouped in accordance with the area, in particular the Tracking Area, to which they belong to in a message transmitted from a radio base station to a mobile station. In one embodiment the grouped cell identity information is transmitted as a broadcast message.

A multi RAT, e.g., GERAN/E-UTRAN, capable mobile station receiving such a broadcast message where the PCIDs are grouped together in tracking area groups is then enabled to determine the neighboring cells, such as E-UTRAN cells that belong to the same area, such as a Tracking Area. As a result when cell reselection to a cell is rejected due to that the area is not allowed, the mobile station can then be allowed to directly initiate cell reselection to cells that are not part of the same group of cells of that area. This in turn results in that no waiting time is needed to initiate a cell reselection towards those cells.

In accordance with one embodiment a method of performing cell reselection in a mobile station is provided. The method comprises receiving a message including the cell identities grouped in accordance with the area to which they belong. The mobile station then performs cell reselection, and attempts to select a cell belonging to another group if the mobile station is rejected in a selected cell after a reduced back off time.

Mobile stations in dedicated/packet transfer/dual transfer modes can use the information about the groups of cells that belong to the same area/Tracking Area in order to avoid unnecessary measurements/measurement reports for all cells that belong to an area/Tracking Area that is not allowed.

In accordance with in one embodiment a mechanism to inform mobile stations in dedicated/packet transfer/dual transfer modes about specific rules that apply towards some neighboring E-UTRAN cells in those modes is provided. For example the mobile stations can be informed that handover is not supported even though cell reselection is supported in idle mode towards the same cells. Such information can be transmitted to mobile stations either by including information about the meaning of different PCID groups, e.g. about black listing, in the broadcasted system information and/or by letting the network inform mobile stations about additional PCIDs not to be included in measurements/measurement reports when in dedicated mode/packet transfer mode/dual transfer mode.

This disclosure also extends to a radio base station and a mobile station configured in accordance with the above.

BRIEF DESCRIPTION OF THE DRAWINGS

The present disclosure will now be described in more detail by way of non-limiting examples and with reference to the accompanying drawings, in which.

DETAILED DESCRIPTION

Figure 1:
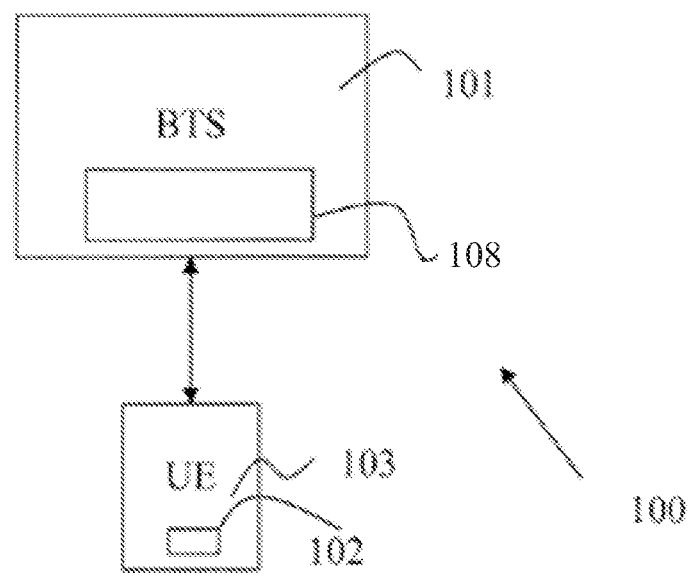
FIG. 1 is a view illustrating a cellular radio system.

In FIG. 1 a view illustrating an exemplary cellular radio system 100 is shown. In the example of FIG. 1 the network is a GERAN system deployed in an area with E-UTRAN cells. The cellular radio system comprises a number of radio base stations 101 associated with Base Transceiver Stations (BTS). The radio base stations 101 can provide radio access for a mobile station 103 using some suitable radio access technology (RAT). The mobile station comprises a module 102 for performing cell reselection. The cellular radio system 100 can be adapted to group the E-UTRAN Physical Layer Cell Identities (PCIDs) in accordance to the Tracking Area they belong to. This can for example be performed in a module 108 in the radio base station. The information about neighboring E-UTRAN frequencies/cells is broadcasted in the network by the radio base station 101 using some radio access technology. In the exemplary embodiment described here the radio access technology is GERAN, but can be any other RAT. The broadcasted information with grouped E-UTRAN Physical Layer Cell Identities (PCIDs) in accordance to the Tracking Area they belong to enables the network to inform a mobile station about different things including but not limited to:

What neighboring E-UTRAN cells that belong to the same Tracking Area by transmitting different groups of PCIDs, The actual Tracking Area for the group of PCID.

Thus, information is included for each PCID group to inform the mobile station whether the group is not allowed, for example because the group does not belong to the same network or is a group where the cells belong to the same Tracking Area.

Figure 2:
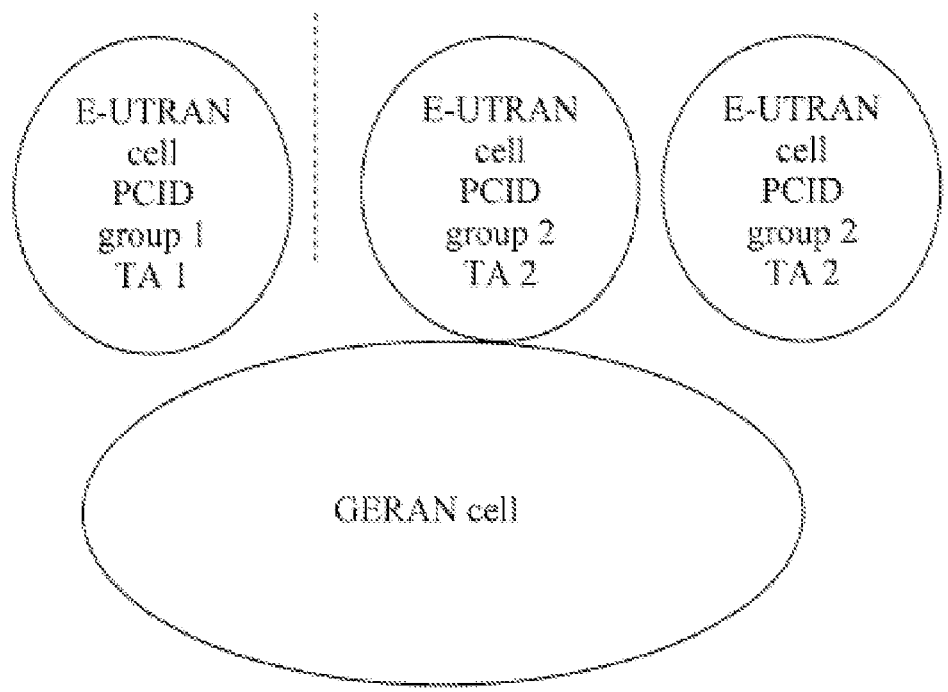
FIG. 2 is a view of an exemplary scenario.

In FIG. 2 an exemplary scenario where one GERAN cell with neighboring E-UTRAN cells that belong to two different Tracking Areas and thus PCID groups as described in conjunction with FIG. 1 is shown. In FIG. 2 a GERAN cell is deployed in an area with three E-UTRAN cells. One of the E-UTRAN cells belongs to a first Tracking Area (TA1) and two of the E-UTRAN cells belong to a second a second Tracking Area (TA2).

Figure 3:
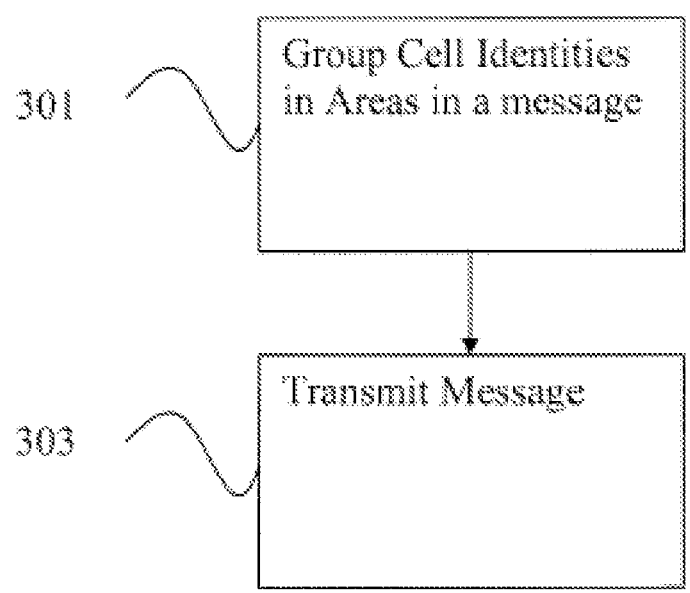
FIG. 3 is a flow chart illustrating steps performed when broadcasting E-UTRAN frequencies.

In FIG. 3, a flow chart illustrating procedural steps performed in a radio base station of a cellular radio system when transmitting grouped cell identities is shown. First in a step 301, the cell identities, such as E-UTRAN Physical Layer Cell Identities (PCIDs), are grouped in accordance with the area, such as Tracking Area, to which they belong to in an information message. Next, in a step 303, the information message is transmitted to a mobile station, for example as a broadcast message.

In accordance with one embodiment a mobile station, that has received information about a group of PCIDs that belong to the same Tracking Area, and which has been rejected in one of those cells due to that the area was not allowed for that user is configured to try to enter any cell not part of that PCID group. In other words, a mobile station having information about how PCIDs are grouped in tracking areas is not required to have a waiting time towards cells not part of a PCID group for which the mobile station has been rejected, since other cells belong to another Tracking Area.

In a dedicated mode/packet transfer mode or dual transfer mode, a mobile station can be configured to use information about a group of PCIDs that belong to a not allowed Tracking Area, in order to avoid unnecessary measurements/measurement reports for those cells.

Figure 4:
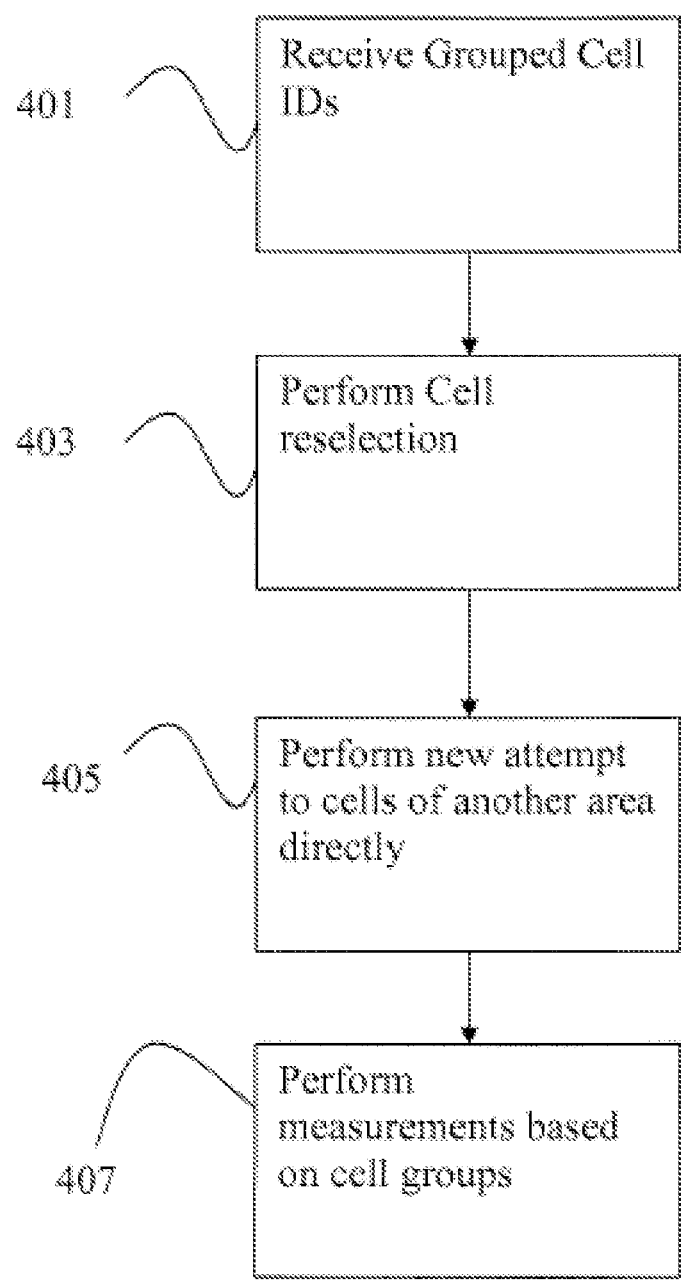
FIG. 4 is a flowchart illustrating steps performed when receiving broadcasted E-UTRAN frequencies.

In FIG. 4, a flow chart illustrating procedural steps performed in a mobile station connectable to a cellular radio system when performing cell reselection and or determining which cells to measure. First in a step 401, an information message with grouped cell identities, such as E-UTRAN Physical Layer Cell Identities (PCIDs) grouped in accordance with the Tracking Area to which they belong to, is received. Next, in a step 403, the mobile station performs cell reselection. Thereupon, in a step 405, the mobile station directly or after a reduced back off time retries to select a cell from another area, such as a tracking area if rejected in a cell of a first area. The mobile station may also, in a step 407, use information about the group of cell identities, such as PCIDs that belong to a not allowed area such as a Tracking Area to select which cells to perform measurements on. For example the mobile station can be configured to avoid performing measurements/measurement reports for cell belonging to an area which the mobile station has been rejected in when the mobile station is in a dedicated mode/packet transfer mode or dual transfer mode.

In accordance with in one embodiment information about black listed E-UTRAN cells is used differently by a mobile station in dedicated mode/packet transfer mode or dual transfer mode compared to when the mobile station is in idle mode. The reason for treating these modes differently is that handovers to cells in one or several of the dedicated/packet transfer/dual transfer modes is not possible/allowed whereas in idle mode a cell reselection is possible/allowed. In order to enable a mobile station to use information about black listed E-UTRAN cells differently a number of different methods can be used. For example information can be included about the meaning of the black listing in the broadcasted system information and/or by letting the network inform the mobile station about additional PCIDs that it shall not include in measurements/measurement reports when in dedicated mode/packet transfer mode/dual transfer mode.

Above a GERAN to E-UTRAN scenario has been described. The same method can also applied towards UTRAN cells, which can be grouped according to the Location Area/Routing Area they belong to in information transmitted from the network to a mobile station.

Also, the information about how different cell identities are grouped in different tracking areas/location areas/routing areas can be broadcasted or sent individually from the network to the mobile stations. The same method can also be applied for the information sent out in other Radio Access Technologies.

Using the methods and devices as described herein will enable multi RAT capable mobile stations to know what neighboring cells, such as E-UTRAN cells that belong to the same area, such as Tracking Area. This is obtained by informing about groups of PCIDs that belong to the same area, such as Tracking Area in the case of E-UTRAN. When cell reselection to a cell is rejected due to that the area, such as a Tracking Area was not allowed, the mobile stations can be enabled to directly initiate cell reselection to cells, such as E-UTRAN cells, that are not part of the same PCID group. No waiting time is thus needed towards those cells.

Mobile stations in dedicated/packet transfer/dual transfer modes can also use the information about the groups of cells that belong to the same Area, such as tracking area, in order to avoid unnecessary measurements/measurement reports for all cells that belong to a, area, such as a Tracking Area, that is not allowed. The measurement gaps are quite limited in those active modes.

The invention claimed is:

1. A method of transmitting information from a radio base station to a mobile station, the information relating to cell identities of cells in a cellular radio system, the system being divided into a plurality of tracking areas that each include one or more of the cells, the method comprising:
   generating a message according to a first Radio Access Technology (RAT) that includes the cell identities of cells of a second RAT, the message grouping the cells of the second RAT in accordance with the tracking areas of those cells; and
   transmitting the message from the radio base station to the mobile station using the first RAT.

2. The method of claim 1, wherein the cell identities are Evolved Universal Mobile Telecommunications System Terrestrial Radio Access Network (E-UTRAN) Physical Layer Cell Identities.

3. The method of claim 1, wherein the mobile station comprises a multi-RAT capable mobile station.

4. The method of claim 1, wherein transmitting the message comprises transmitting the message as a broadcast message.

5. A method implemented by a mobile station for performing cell reselection in a cellular radio system that includes a plurality of cells, wherein each cell is identified by a cell identity, wherein the cellular radio system is divided into a plurality of areas that each include one or more of the cells, and wherein the method comprises:
   receiving a message that includes the cell identities grouped in accordance with the area to which their respective cells belong;
   attempting to perform cell reselection by selecting a first cell; and
   responsive to rejection by the first cell, attempting to perform cell reselection again, by selecting a second cell that, according to the received message, belongs to a different area than that of the first cell.

6. The method of claim 5, wherein attempting to perform cell reselection again, responsive to rejection by the first cell, comprises attempting to perform cell reselection again directly after rejection by the first cell.

7. The method of claim 5, wherein the cell identities are Evolved Universal Mobile Telecommunications System Terrestrial Radio Access Network (E-UTRAN) Physical Layer Cell Identities.

8. The method of claim 5, wherein the mobile station comprises a multi-RAT (radio access technology) capable mobile station, wherein receiving the message comprises receiving the message with one RAT, the message including cell identities associated with a different RAT.

9. The method of claim 5, wherein receiving the message comprises receiving the message as a broadcast message.

10. A radio base station configured to transmit information relating to cell identities of cells in a cellular radio system, the system being divided into a plurality of areas that each include one or more of the cells, the radio base station comprising a module configured to:
    generate a message according to a first Radio Access Technology (RAT) that includes the cell identities of cells of a second RAT, the message grouping the cells of the second RAT in accordance with the tracking areas of those cells; and
    transmit the message to the mobile station using the first RAT.

11. The radio base station of claim 10, wherein the cell identities are Evolved Universal Mobile Telecommunications System Terrestrial Radio Access Network Physical Layer Cell Identities.

12. The radio base station of claim 10, wherein the area is a tracking area.

13. The radio base station of claim 10, wherein the radio base station is configured to transmit the message as a broadcast message.

14. A mobile station configured to perform cell reselection in a cellular radio system that includes a plurality of cells, wherein each cell is identified by a cell identity, wherein the cellular radio system is divided into a plurality of areas that each include one or more of the cells, and wherein the mobile station comprises a module configured to:
    receive a message that includes the cell identities grouped in accordance with the area to which their respective cells belong;
    attempt to perform cell reselection by selecting a first cell; and
    responsive to rejection by the first cell, attempt to perform cell reselection again, by selecting a second cell that, according to the received message, belongs to a different area than that of the first cell.

15. The mobile station of claim 14, wherein the module is configured to attempt to perform cell reselection again directly after rejection by the first cell.

16. The mobile station of claim 14, wherein the cell identities are Evolved Universal Mobile Telecommunications System Terrestrial Radio Access Network (E-UTRAN) Physical Layer Cell Identities.

17. The mobile station of claim 14, wherein the mobile station comprises a multi-RAT (radio access technology) capable mobile station, wherein the module is configured to receive the message with one RAT, and wherein the message includes cell identities associated with a different RAT.

18. The mobile station of claim 14, wherein the module is configured to receive the message as a broadcast message.

* * * * *